United States Patent [19]
McDermott et al.

[11] Patent Number: 6,089,748
[45] Date of Patent: Jul. 18, 2000

[54] APPARATUS FOR STABILIZING A MIXER WHICH CIRCULATES LIQUID AGAINST EXCESSIVE OSCILLATION

[75] Inventors: Keith T. McDermott; Ronald J. Weetman, both of Rochester, N.Y.

[73] Assignee: General Signal Corporation, Rochester, N.Y.

[21] Appl. No.: 09/164,827

[22] Filed: Oct. 1, 1998

[51] Int. Cl.⁷ ................................................. B01F 15/00
[52] U.S. Cl. ...................... 366/262; 366/326.1; 416/145; 416/500; 464/180
[58] Field of Search .................................. 366/102, 270, 366/326.1, 330.1–330.7, 342, 343, 262–265; 74/574; 416/144, 145, 240, 500; 464/180, 181

[56] References Cited

U.S. PATENT DOCUMENTS

| | | |
|---|---|---|
| 1,485,788 | 3/1924 | Lamwers . |
| 2,397,132 | 3/1946 | Dent, Jr. . |
| 2,991,051 | 7/1961 | Jones . |
| 3,075,406 | 1/1963 | Bulter, Jr. et al. . |
| 3,215,410 | 11/1965 | McMaster et al. . |
| 3,326,533 | 6/1967 | Sturrup . |
| 3,407,882 | 10/1968 | Wooden et al. . |
| 3,594,098 | 7/1971 | Pratinidhi ................................ 416/144 |
| 3,812,812 | 5/1974 | Hurwitz .................................. 416/236 |
| 4,255,084 | 3/1981 | Mouille et al. . |
| 4,281,967 | 8/1981 | Mouille et al. . |
| 4,527,904 | 7/1985 | Weetman . |
| 5,049,034 | 9/1991 | Cahoon . |
| 5,219,454 | 6/1993 | Class ........................................ 74/574 |
| 5,326,168 | 7/1994 | Miura . |
| 5,354,237 | 10/1994 | Amborn et al. . |
| 5,484,264 | 1/1996 | Karls et al. . |
| 5,660,256 | 8/1997 | Gallmeyer et al. . |
| 5,666,862 | 9/1997 | Eckel et al. . |
| 5,931,051 | 8/1999 | Ott ........................................... 74/574 |

*Primary Examiner*—Charles E. Cooley
*Attorney, Agent, or Firm*—M. Lukacher; K. Lukacher

[57] ABSTRACT

Mixer apparatus having an impeller on a shaft, which circulates a body of liquid the surface of which can clear the impeller, especially when the liquid is in a tank, and the tank is drained, is protected against excessive by use of a flexural member, which may be in the form of radially opposed pairs of resilient plates, which extend from the shaft and are attached thereto by a collar. As the liquid surface drops below the impeller, the members present surfaces to the liquid in the tank on which forces are opposing the oscillation are developed by interaction of the surfaces with the liquid in the tank. Restoring forces on the shaft due to the flexing of the resilient plates also reduce the shaft oscillation. The stiffness of the plates is selected to optimize the restoring forces for the mixing apparatus which is stabilized.

13 Claims, 2 Drawing Sheets

APPARATUS FOR STABILIZING A MIXER WHICH CIRCULATES LIQUID AGAINST EXCESSIVE OSCILLATION

DESCRIPTION

The present invention relates to mixing apparatus and more particularly to mixing apparatus which is stabilized against oscillation which can occur when the mixing impeller approaches the surface of the liquid being mixed and is partially covered or clears the surface, as occurs when a tank containing the liquid in which the mixing apparatus is drained.

The fluid forces on a mixer, and especially on the mixer shaft, is a function of the depth of submergence of the impeller of the mixing apparatus below the surface of the body of liquid being mixed. These forces can cause wobbling of the shaft; deflection of the shaft being included in what is meant by wobbling. As the mixer clears the surface, a resonant condition related to the natural frequency of the impeller-shaft system can occur, which aggravates the wobbling and can cause a catastrophic failure of the shaft, and even its support structure.

Mixers have used stabilizer rings connected to the impeller blades, or to the shaft, which project below the impeller. Also, stabilizing fins which project downwardly from the blades have been proposed so as to maintain a portion of the rotating impeller system below the surface of the liquid and use the liquid to oppose oscillation. Fluid forces which result in oscillation are described in a patent issued to Ronald J. Weetman, U.S. Pat. No. 4,527,904, issued Jul. 9, 1985. Miura, U.S. Pat. No. 5,326,168, Jul. 5, 1994 discusses stabilizing rings and fins. Counter weights attached to springs have been used for damping shaft vibrations. C. Mouille, et al., U.S. Pat. No. 4,281,967, Aug. 4, 1981; Cahoon, U.S. Pat. No. 5,049,034, Sep. 17, 1991, Gallmeyer, et al., U.S. Pat. No. 5,660,256, Aug. 26, 1997, Eckel, U.S. Pat. No. 5,666,862, Sep. 16, 1997 and Wooden, U.S. Pat. No. 3,407,882, Oct. 29, 1968. A stabilization apparatus for mixing apparatus which counteracts oscillation, both by utilizing stabilizing forces developed by interaction with the liquid and produces surface waves, having amplitudes which are a function of oscillation and also which flexurally damps oscillation, is provided by this invention. Thus, stabilization against oscillation is effected by a plurality mechanisms to oppose the oscillation.

Accordingly, it is the principal object of the invention to provide improved apparatus for stabilizing mixing apparatus and opposing oscillation of a mixing impeller and the shaft which rotates the impeller, especially as the impeller approaches and clears the surface of the liquid during mixing, as occurs when a tank containing the liquid is drained.

It is a further object of the present invention to provide for the stabilization of a mixing system, effectively and at low cost.

It is a still further object of the present invention to provide mixing apparatus with an improved stabilization device which does not interfere with the circulation of liquid, by the mixing impeller of the apparatus.

Briefly described, stabilizing apparatus embodying the invention is useful on mixing apparatus having a shaft and a mixing impeller with a plurality of blades on the shaft. The impeller circulates liquid. The depth of which impeller from the surface of the liquid varies so that impeller, while rotating, can be disposed under the surface of the liquid, partially submerged or above the surface. In such cases, the impeller and the shaft oscillates or deflects (called oscillation herein) in a direction transverse to the axis of the shaft with an amplitude which increases as the impeller approaches and clears the surface of the liquid. The stabilizing apparatus provided by the invention has a flexural member which is rotatable with the shaft and disposed below the surface. The flexural member presents a surface area transverse to the direction in which the shaft oscillates. Since the flexural member is below the surface, it utilizes the forces exerted by said liquid on the flexural member as it deflects, to oppose oscillation. The flexural member is also a spring damping device. Thus there are two mechanisms which contribute to the reduction of oscillation, namely the mechanism using the reaction force of the liquid and, the mechanism using restoring forces developed in the spring material of the flexural member.

The foregoing and other objects features and advantages of the invention will become more apparent from a reading of the following description which describes in detail a presently preferred embodiment of the invention, brief descriptions of which drawings follow.

BRIEF DESCRIPTION OF DRAWINGS

Referring to FIGS. 1 and 2 there is shown a device for stabilizing mixer apparatus 10. The device has a collar 12 which may be installed on a mixer shaft, as shown in FIG. 3. A set screw 16 and sleeve 18 serve to connect the device 10 to the shaft 14.

Figure 1:
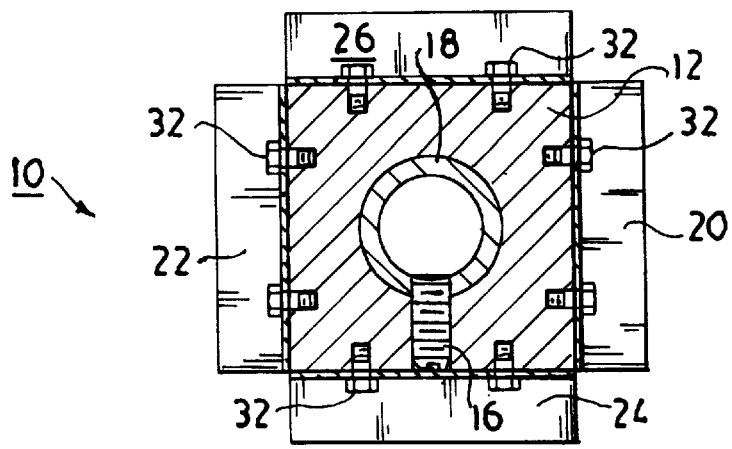
FIG. 1 is a sectional view, from the top, of a mixer stabilization device in accordance with the invention, the view being taken along the line 1—1 in FIG. 2. A collar is attached to the shaft which in this example is square, but can be other shapes such as circular. The mixer shaft on which the device is mounted is omitted in FIGS. 1 and 2.
Figure 2:
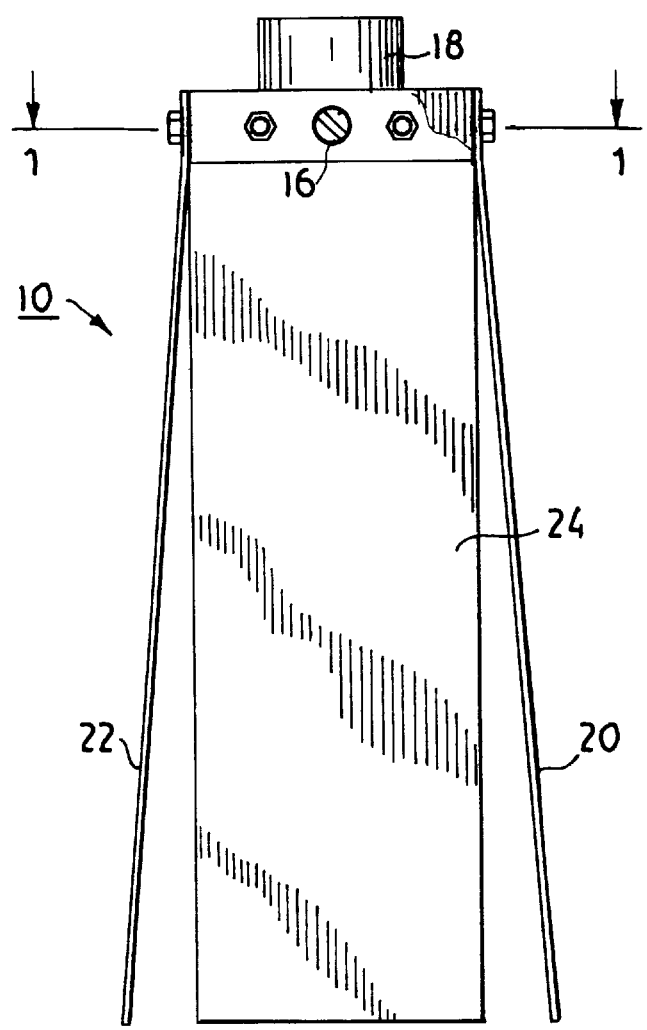
FIG. 2 is an elevational view of the stabilization device shown in FIG. 1.

The device 10 has a plurality of flexural members, provided by pairs of plates 20, 22, and 26. These plates are strips of resilient material, for example of metal such as steel or brass or bronze, or even plastic selected to have the requisite stiffness and ability to withstand corrosion or other chemical attacks from the liquid 30 which is being circulated and mixed. The stiffness is also selected so as to provide requisite restoring force, while limiting deflection so that the plates do not interfere, substantially, with the circulation of the liquid, by the impeller 15 of the mixing system. The flexural plates 20, 22, 24 and, 26 are attached, as by bolts 32, at the upper end thereof to the collar. The collar may be square or round. A square collar is preferred, since a round collar can make the cross section of the members 20–26 arcuate, which may undesirably increase the stiffness thereof. The plates 20 to 26 may be attached to an extension of the hub of the impeller or in other ways to the rotatable components, but below the impeller. The plates are preferably about 0.2 to 0.3 times the diameter of the impeller and the pairs of plates are separated at the collar about 0.15 of the diameter of said impeller and flare radially outward to about 0.30 the diameter. Each plate being about 0.075 of the diameter from the axis of rotation at the collar and 0.15 from the axis of the diameter at the lower end thereof.

Figure 3:
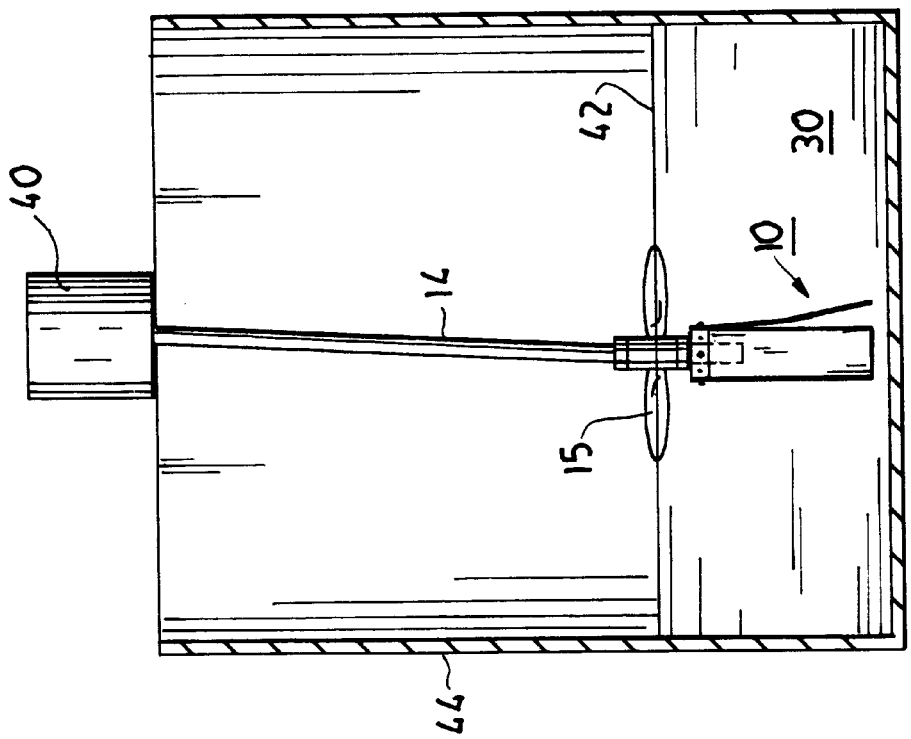
FIGS. 3 and 4 are schematic drawings illustrating the stabilization device in operation on a mixer having an impeller on a shaft and driven by a drive mechanism including a motor.

As shown in FIG. 3 the flexural plate members are suspended from the collar along a portion of the shaft 14, which extends below the impeller 15. The flexural plate members also have a length which is sufficient to provide forces to control oscillation of the mixer apparatus, depending upon the characteristics of the fluid in the tank and the dimensions and geometry of the mixer apparatus, such as the material and diameter of the shaft 14. The impeller 15 has a plurality of blades, say three blades. The number of radially opposed plates, preferably 22–26, preferably exceeds the number of impeller blades so that the damping and restoring forces, which counteract oscillation of the shaft 14 and impeller 15, are distributed more evenly about the axis of rotation of the impeller (the axis of the shaft 14). There may be an odd number of plates, such as five or seven blades. These blades may have like angular spacing about the shaft, for example 72° spacing for five plates.

Figure 4:
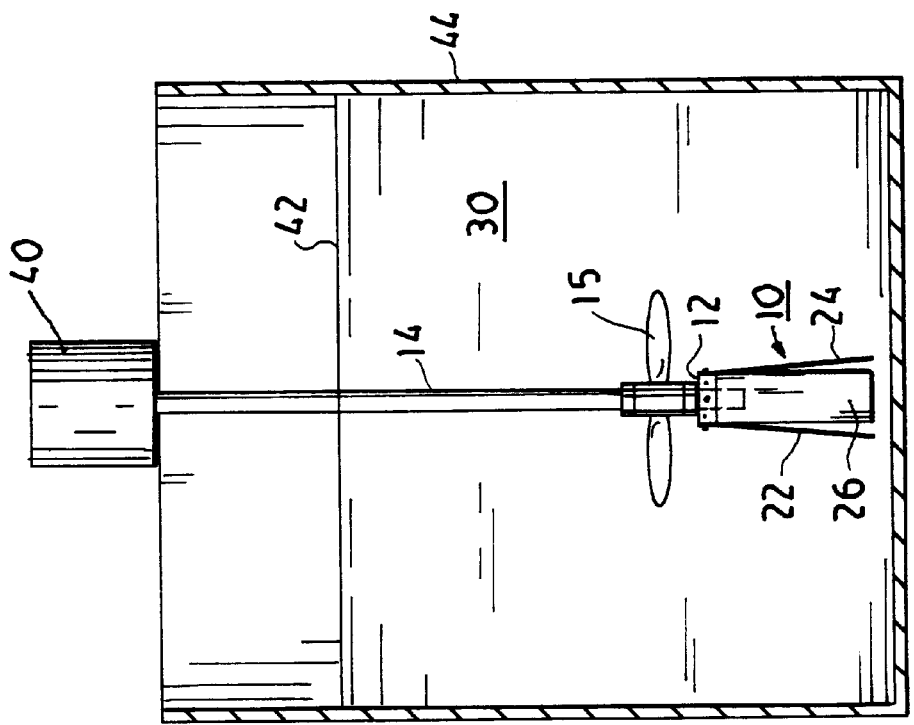

As shown in FIGS. 3 and 4, the mixing apparatus shaft is driven by a drive system 40, which, as is conventional, includes a motor and gear box. Initially the impeller 15 is submerged entirely below the surface 42 of the liquid 30, which may be maintained in a tank 44. As liquid is withdrawn from the tank, the impeller 15 is positioned at the surface, as shown in FIG. 4. This aggravates oscillation producing conditions where the shaft can oscillate at its natural frequency. If the speed of the mixing apparatus is close to its critical speed, resonance conditions can occur.

The location of the device 10 is such that is remains submerged even while the liquid is being withdrawn, at least in principal part, since the lower end of the plates 22–26 are close to the bottom of the tank 44 and drainage is stopped, usually, before the liquid is withdrawn below the device 10. When oscillation occurs, the plates present their surface areas in the direction of the oscillation, or deflection of the shaft, to the liquid. Reaction forces are applied by the liquid in response to this deflection which tends to damp the oscillation. In addition, the spring characteristics of the resilient plate members 22–26, when they deflect establishes a restoring force also in the direction to oppose the oscillation. Accordingly, two mechanisms come into play, which counteract oscillation and stabilize the mixing apparatus.

From the foregoing description it will be apparent that there has been provided improved mixing apparatus and particularly, mixing apparatus which employs stabilization device taking advantage of the damping effect of the liquid, as well as, spring damping effects. Various undesirable motion of the mixer can be reduced which includes oscillation and other oscillation motion. Variations and modifications in the herein described apparatus and stabilization device thereof, will undoubtedly suggest themselves to those skilled in the art. Accordingly, the foregoing description should be taken as illustrative, and not in an limiting sense.

What is claimed is:

1. In a mixing apparatus having a shaft, having an axis and a mixing impeller having a plurality of blades on such shaft, said impeller circulates liquid the depth of which varies, so that the spacing of said impeller from the surface of said liquid varies and can experience oscillation transverse to said axis, with an amplitude which increases as said impeller approaches the surface of said liquid, stabilizing apparatus comprising a flexural member rotatable with said shaft and disposed to extend below said surface, said member presenting a surface area transverse to the direction in which said shaft oscillates, said member having sufficient stiffness to develop forces transverse to said axis opposing said oscillation when deflected in response to said oscillation.

2. The stabilizing apparatus according to claim 1, wherein said flexural member comprises a plate fixed to said shaft at an end thereof and flexible about said end.

3. The stabilizing apparatus according to claim 2, wherein said plate is made of resilient material.

4. The stabilizing apparatus according to claim 3, wherein said resilient material is metal.

5. In a mixing apparatus having a shaft, having an axis and a mixing impeller having a plurality of blades on said shaft, said impeller circulates liquid the depth of which varies, so that the spacing of said impeller from the surface of said liquid varies and can experience oscillation transverse to said axis with an amplitude which increases as said impeller approaches the surface of said liquid, stabilizing apparatus comprising a flexural member rotatable with said shaft and disposed to extend below said surface, said member presenting a surface area transverse to the direction in which said shaft oscillates, said flexural member comprising a plate fixed to said shaft of an end thereof and flexible about said end, and the plate is a generally rectangular strip of flexible material having a length extending below said impeller.

6. The stabilizing apparatus according to claim 5, wherein a plurality of said plates are rotatable with said impeller.

7. The stabilizing apparatus according to claim 6, wherein said plurality of plates comprises at least one pair of plates located radially opposite each other with respect to said shaft and in opposing relationship.

8. The stabilizing apparatus according to claim 7, wherein a plurality of said pairs of plates are suspended from said shaft.

9. The stabilizing apparatus according to claim 7, wherein a collar is attached to said shaft and said plates are attached on one end thereof and suspended from said collar.

10. The stabilizing apparatus according to claim 9, wherein said collar is square in cross section and has four sides, said blades being attached each to a different one of said sides.

11. The stabilizing apparatus according to claim 6 wherein the number of said plates exceeds the number of blades of said impeller.

12. In a mixing apparatus having a shaft having an axis and a mixing impeller having a plurality of blades on said shaft, said impeller circulates liquid the depth of which varies, so that the spacing of said impeller from the surface of said liquid varies and can experience oscillation in a direction transverse to said axis with an amplitude which increases as said impeller approaches the surface of said liquid, stabilizing apparatus comprising a member rotatable with said shaft and disposed to extend below said surface, said member having sufficient stiffness to develop forces transverse to said axis opposing said oscillation when deflected in response to said oscillation, said member presenting the surface transverse to the direction in which said shaft oscillates, said member being radially spaced less than about 0.07 to 0.15 of the diameter of said impeller from the axis of rotation of said impeller.

13. The stabilizing apparatus according to claim 12 wherein the length of said member in the direction of said axis is about 0.2 to 0.3 of the diameter of said impeller.

* * * * *